United States Patent [19]

Watkins

[11] Patent Number: 4,572,296

[45] Date of Patent: Feb. 25, 1986

[54] STEAM INJECTION METHOD

[75] Inventor: David R. Watkins, Irvine, Calif.

[73] Assignee: Union Oil Company of California, Los Angeles, Calif.

[21] Appl. No.: 653,027

[22] Filed: Sep. 20, 1984

[51] Int. Cl.$^4$ ............................................. E21B 43/24
[52] U.S. Cl. .................................... 166/303; 166/902
[58] Field of Search ..................... 166/272, 303, 244 C

[56] References Cited

U.S. PATENT DOCUMENTS

| | | | |
|---|---|---|---|
| 3,379,249 | 4/1968 | Gilchrist et al. | 166/303 X |
| 3,822,749 | 7/1974 | Thigpen, Jr. | 166/303 |
| 3,938,590 | 2/1976 | Redford et al. | 166/272 X |
| 4,156,463 | 5/1979 | Hall | 166/272 |
| 4,222,439 | 9/1980 | Estes et al. | 166/272 |
| 4,223,731 | 9/1980 | Estes et al. | 166/272 |
| 4,475,595 | 10/1984 | Watkins et al. | 166/303 |
| 4,476,930 | 10/1984 | Watanabe | 166/244 C X |

OTHER PUBLICATIONS

M. G. Reed, "Gravel Pack and Formation Sandstone Dissolution During Steam Injection", *Journal of Petroleum Technology*, vol. 32, pp. 941-949 (1980).

J. O. Amaefule, P. C. Padilla, F. G. McCaffery, and S. L. Teal, "Steam Condensate: Formation Damage and Chemical Treatments for Injectivity Improvement", SPE Paper No. 12499 (1984).

*Primary Examiner*—George A. Suchfield
*Attorney, Agent, or Firm*—Dean Sandford; Gregory F. Wirzbicki; Robert A. Franks

[57] ABSTRACT

A method is disclosed for inhibiting silica dissolution during steam injection into a formation. In the method, there is added to the steam, or to feedwater used to generate the steam, a mixture comprising:

(a) a compound selected from the group consisting of ammonium salts of inorganic acids, ammonium salts of carboxylic acids, quaternary ammonium halides, amine or substituted amine hydrochlorides, and mixtures thereof; and (b) a compound selected from the group consisting of ammonia, salts which decompose in steam to form acid neutralizers or buffers having alkaline pH values, amides of carbamic acid or thiocarbamic acid and derivatives of such amides, tertiary carboxylic acid amides and their substituted and alkylated derivatives, and mixtures thereof.

In steam, the compound of (a) decomposes to form a proton, which neutralizes hydroxide generated by ions in the steam generator feedwater. The compound of (b) neutralizes or buffers the steam to prevent acidic pH values which would be obtained from overtreatment with compound (a) above.

30 Claims, No Drawings

STEAM INJECTION METHOD

BACKGROUND OF THE INVENTION

1. Field of the Invention

This invention relates to a method for treating a subterranean reservoir penetrated by a well wherein, as part of the treatment, steam is injected into the reservoir. More particularly, the invention relates to such a method involving inhibiting the dissolution of silica from the permeable reservoir rock or from a gravel pack positioned in the well opposite the portion of the reservoir into which steam is injected.

2. Description of the Art

Various treatments of permeable subterranean reservoirs penetrated by one or more wells involve injection of steam into the reservoir. Typical reservoirs include hydrocarbon-producing reservoirs, particularly those reservoirs containing heavy oil, bitumen, tar or similar viscous hydrocarbons. An example of one type of treatment involves the injection of steam into a portion of a reservoir to raise the temperature and consequently decrease the viscosity of the viscous hydrocarbons contained in the reservoir. Subsequently, these hydrocarbons can be more easily moved through the reservoir to a well through which they can be produced to the surface of the earth. Such treatments can be of the type referred to as a steam drive wherein steam is injected via one well and hydrocarbons are pushed through the reservoir and produced via another well. Alternatively, the treatments can be of the cyclic steam injection type involving a single well wherein steam is injected for a first period of time following which the same well is produced for a second period of time.

A steam source provides steam for injection into the reservoir. The steam source is most often a fuel-fired steam generator capable of producing either essentially dry steam, containing as much as 95 percent by weight of vapor, or wet steam such as steam containing various amounts of liquid water up to more than 80 percent by weight. More typically, a mixture containing 50 to 80 percent by weight vapor is employed in the process of this invention. These mixtures are said to have a steam quality of 50 to 80 percent. Water from a water source such as a well, pond, stream, lake, or similar source constitutes the generator feed water. The water can be transported directly from the source into the generator or may be treated first for removal of particulate matter or dissolved scale-forming components. Since many wells are located in remote, often arid areas, a convenient source of high purity water is frequently unavailable. The steam generator may be positioned downhole, but more often is positioned at the surface of the earth in the vicinity of the injection well.

The well via which the steam is injected into the reservoir may be completed in any of a number of ways. The bottom of the well is sometimes left open with a conduit extending to near the bottom of the well, through which fluids may be injected into or produced out of the reservoir. It has, however, been discovered when steam is injected through such a system that many oil-bearing reservoirs do not have sufficient physical strength to maintain their integrity during the production phase. Such reservoirs are frequently referred to as incompetent reservoirs. Finely divided particles become dislodged from an incompetent reservoir and move with the produced fluids into the well where the particles may settle and plug the tubing or other equipment in the well. If the incompetent reservoir is under a high pressure, the high velocity of the particles as they flow with the produced fluids may cause severe erosion of well equipment.

A technique commonly employed for controlling the flow of sand from an incompetent reservoir into a well involves the forming of a gravel pack in the well adjacent to the portion of the incompetent reservoir through which fluids will pass into the well. The gravel pack is made up of coarse particles of sand, gravel, glass, cement clinker, ground nut shells, ceramic material or the like, which particles will normally range between about 2½ and 40 mesh on the U.S. Sieve Series Scale in size. Particles between about 4 and 20 mesh are normally preferred. It is generally advantageous to employ particles falling within a narrow size range. Hence, particles of about 4 to 6 mesh, 6 to 8 mesh, 8 to 12 mesh, or 10 to 20 mesh will generally be used. The gravel pack is formed by injecting a fluid suspension of gravel or similar particles into the well to form a bed of solids containing small openings over which the reservoir sand will bridge. The flow of sands from the formation into the well during subsequent production operations is mitigated.

It is known that injection of steam into a reservoir can cause certain problems with respect to a gravel pack. M. G. Reed, "Gravel Pack and Formation Sandstone Dissolution During Steam Injection," *Journal of Petroleum Technology*, Vol. 32, pages 941–949 (1980). This paper describes a laboratory study of the problem that steam injected into a reservoir during oil recovery operations can dissolve large amounts of gravel pack sands and formation sandstones. In some cases, downstream reprecipitation of reaction products can damage sandstone permeability. It is suggested that this dissolution can be decreased by lowering the pH of the hot alkaline steam generator effluent or by removal of bicarbonate ions from the effluent.

While some well-treating methods have met with some success in particular applications, the need exists for a further improved steam injection treatment without substantial damage to the matrix around the well.

Therefore, it is a principal object of this invention to provide a method for enhanced oil recovery from a reservoir containing hydrocarbons, especially viscous hydrocarbons, by injecting steam into the reservoir.

It is a further object to provide such a method operable in treating wells penetrating permeable siliceous reservoirs or wells containing a gravel pack extending over the interval of the reservoir through which are passed fluids injected into or withdrawn from the reservoir.

It is a still further object to provide such a method wherein the dissolution by steam of silica from the reservoir or from the gravel pack is inhibited.

Other objects, advantages and features of this invention will become apparent to those skilled in the art from the following description and appended claims.

SUMMARY OF THE INVENTION

Briefly, the invention provides a method for inhibiting the dissolution of silica from silica-containing material in the vicinity of a well, especially a gravel pack and/or the reservoir rock, during a well treatment involving the injection of steam into the reservoir, by adding to the boiler feedwater or to the steam itself, at some point prior to the time the steam contacts the silica-containing material, a mixture comprising: (1) a compound containing ammoniacal nitrogen selected from the group consisting of ammonium salts of inorganic acids, ammonium salts of carboxylic acids, quaternary ammonium halides, amine or substituted amine hydrochlorides; and (2) a compound selected from the group consisting of ammonia, salts which decompose to form acid neutralizers and/or buffers having alkaline pH values, amides of carbamic acid and thiocarbamic acid, derivatives of such amides, tertiary carboxylic acid amides and their substituted and alkylated derivatives. Stated another way, the inhibitor comprises a mixture of: (1) a first compound containing a protonated ammonium or substituted ammonium ion capable of decomposing in the presence of steam to form a proton and an ammonium or a substituted ammonium cation, the proton remaining in the liquid phase and the ammonium or substituted ammonium cation in the vapor phase; and (2) a second compound which hydrolyzes in steam, providing a neutralizing and/or buffering effect in the liquid phase to prevent excessive pH reduction by formed protons from the first compound.

DESCRIPTION OF THE INVENTION

In oil recovery operations, it is sometimes desired to inject wet steam, i.e., a mixture of a vapor phase and a liquid phase, into a permeable hydrocarbon-containing reservoir penetrated by a well. The steam aids in stripping hydrocarbons from the reservoir rock, by lowering the viscosity of the hydrocarbons so that they flow more easily through the reservoir. However, it has been the experience that steam also tends to dissolve silica from silica-containing reservoirs adjacent the well and from gravel packs positioned in the well. This dissolution loosens small particles of the reservoir rock which can shift position and cause formation damage, e.g., at least partially plug the pores of the reservoir. If a gravel pack is attacked by steam, it can no longer perform its function of screening out loose formation fines and preventing them from being produced along with fluids subsequently produced from the reservoir through the gravel pack.

The source of steam used in the process of this invention is most frequently a steam generator. Boiler feedwater used in the generator often contains at least some bicarbonate ions. When steam is generated, the bicarbonate ion decomposes as follows:

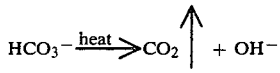

The carbon dioxide partitions into the gas phase while the hydroxyl ion remains in the liquid phase and increases its alkalinity. The solubility of siliceous minerals increases dramatically as pH increases. These minerals, therefore, are quite soluble in the alkaline liquid phase of steam. In addition, it is believed that as steam containing dissolved silica is pushed further out from the well into a reservoir, the solution cools, causing reprecipitation of the silica which partially plugs the reservoir pores and contributes to formation damage. A second component of the inhibitor comprises a compound selected from the group consisting of ammonia, salts which decompose to form acid neutralizers or buffers having alkaline pH values, amides of carbamic acid and thiocarbamic acid, derivatives of such amides, and tertiary carboxylic acid amides and their substituted and alkylated derivatives. This component, in combination with the first component, provides a neutralization or pH buffering effect in the steam liquid phase, preventing the large decreases in pH which would result from over-treatment with only the first component.

The inhibitor can be added directly to the feedwater used to generate the steam or to the steam itself. It is generally more convenient to prepare a concentrated solution of the inhibitor and add the concentrate to the feedwater or to the steam. Any liquid having mutual solubility for water and the inhibitor may be used to prepare the concentrate. For example, a solution of an inhibitor in an alcohol such as ethanol may be used. However, an aqueous solution is generally employed.

When an inhibitor is added to the system, the first component decomposes when steam is generated as follows, using ammonium chloride as an example:

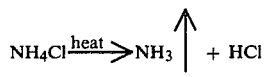

The ammonia partitions into the gas phase while hydrogen chloride remains in the liquid phase where it increases the acidity of the liquid. Therefore, the first component must be selected from compounds which do not form buffer systems having alkaline pH values, upon hydrolysis in steam.

The hydroxyl ion from the bicarbonate ion tends to be neutralized by the acid from the first component. Thus, the inhibitor should provide approximately one equivalent weight of the first component for every equivalent weight of bicarbonate ion present in the feedwater. Significant inhibition of silica dissolution has been achieved by using about 0.10 to 2.5 equivalents of first component per equivalent of bicarbonate. Stated another way, enough is added to the system to adjust the pH of the water phase of the steam (including condensed steam) to values below about 11, preferably about 10.5 to about 7 and more preferably about 9.4 to about 8.7. Frequently, whether the inhibitor is added to the feedwater or the steam itself, about 5 to about 5,000 milligrams per liter (mg/l), based upon the volume of feedwater, of the first component are used. More preferably, about 50 to 1,500 mg/l are employed.

The first component of the inhibitor is an ammonium or substituted ammonium compound selected from the group consisting of ammonium salts of inorganic acids, ammonium salts of carboxylic acids, quaternary ammonium halides, amine or substituted amine hydrochlorides, and mixtures of any of these compounds.

Examples of suitable ammonium salts of inorganic acids include ammonium nitrate, ammonium nitrite, ammonium sulfate, ammonium bisulfate, ammonium sulfite, ammonium bisulfite, ammonium sulfamate, ammonium borate, ammonium cyanate and derivatives thereof, ammonium thiocyanate, ammonium chromate, ammonium dichromate, and ammonium halides such as ammonium chloride, ammonium bromide, ammonium fluoride, ammonium bifluoride, and ammonium iodide. Particularly good results have been obtained with ammonium chloride. Ammonium nitrate is also a preferred salt.

Examples of suitable ammonium salts of a carboxylic acid include ammonium acetate, ammonium citrate, ammonium tartrate, ammonium formate, ammonium gallate and ammonium benzoate.

The quaternary ammonium compounds for use in this invention can be represented by the general formula:

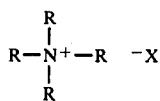

wherein at least one of the groups R is an organic hydrophobic group having 1 to 20 carbon atoms. The other substituents are independently alkyl or hydroxyalkyl groups having 1 to 4 carbon atoms, benzyl groups or alkoxy groups of the formula $(C_2H_4O)_nH$ or $(CH_3H_6O)_nH$ where n is 2 to 10. A preferred anion in the quaternary ammonium compounds is chloride. This can be replaced by various other anions such as bromide, iodide or ethylsulfate ions. Exemplary of suitable quaternary ammonium compounds are tetramethyl ammonium chloride, dioctyl dimethyl ammonium chloride, dodecyl trimethyl ammonium chloride, cetyl trimethyl ammonium chloride, cetyl trimethyl ammonium bromide, dodecyl trimethyl benzyl ammonium chloride, ethyltrimethyl ammonium iodide, iodomethyl-trimethyl ammonium iodide, tetramethyl ammonium hepta-iodide and methyl pyridinum chloride. Particularly good results have been obtained with tetramethyl ammonium chloride.

Also useful are amine or substitute amine hydrochlorides such as the mono-, di- and tri-alkyl amine hydrochlorides wherein the alkyl group contains 1 to 20 carbon atoms, straight chain or branched, aryl amine hydrochlorides, hydroxy-substituted amine hydrochlorides and heterocyclic-substituted amine hydrochlorides. Examples of suitable materials include methylamine hydrochloride, ethylamine hydrochloride, propylamine hydrochloride, butylamine hydrochloride, dodecylamine hydrochloride, diethylamine hydrochloride, triethylamine hydrochloride, benzylamine hydrochloride, hydroxylamine hydrochloride, 2-aminopyridine hydrochloride and 4-aminopyridine hydrochloride. Particularly good results have been obtained with butylamine hydrochloride.

Occasionally, however, through lack of data concerning the bicarbonate content of the boiler feedwater, lack of process control, changes in feedwater composition, operator inattentiveness, and the like, an excessive amount of the first component, if used alone, could be utilized. This overtreatment will result in the production of protons in excess of those required for neutralization of bicarbonate, giving pH values in the steam liquid phase which are below 7. A primary undesired effect of acid pH values is corrosion of metals of the steam generation and transportation system, such corrosion increasing dramatically in rate as the pH continues to decrease.

A second component of the inhibitor of this invention is a compound selected from the group consisting of ammonia, salts which decompose to form acid neutralizers or buffers having alkaline pH values, amides of carbamic acid and thiocarbamic acid and derivatives of such amides, tertiary carboxylic acid amides and their substituted and alkylated derivatives, and mixtures of any of the foregoing compounds. Ammonia, a preferred second component, can be introduced in the gaseous form or as aqueous solutions; most of the other materials hydrolyze in steam to provide ammonia and/or ammonium ions.

One group of compounds is the amides of carbamic acid and thiocarbamic acid, including urea, biuret, triuret, thiourea and ammonium carbamate. Urea is presently the most preferred second component for use in the invention.

Another group of compounds is derivatives of carbamic acid and thiocarbamic acids, including monomethylurea and dimethylurea.

Still another group of compounds is tertiary carboxylic acid amides, and their substituted and alkylated amide derivatives, characterized by the formula:

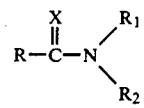

wherein (1) R is hydrogen or an organic radical, particularly an alkyl group containing 1 to about 8 carbon atoms, or an alpha-hydroxy substituted alkyl group containing 1 to about 8 carbon atoms, (2) $R_1$ and $R_2$ are independently selected from hydrogen and organic radicals, with alkyl groups containing 1 to about 8 carbon atoms being the preferred organic radical, and (3) X is oxygen or sulfur. Useful tertiary carboxylic acid amides and their substituted and alkylated amide counterparts include formamide, acetamide, N,N-diethylacetamide, N,N-dipropylacetamide, N,N-dimethylpropionamide and N,N-diethylpropionamide. Other species which may be used include N-methyl,N-ethylacetamide, and the like.

Further, compounds which decompose in steam to form acid neutralizers or buffers having alkaline pH values are useful as the second component of the inhibitor. Such compounds include carbonates, hydroxides, and phosphates, particularly the ammonium salts. However, alkali metal salts, such as the sodium and potassium salts, can also be used, even though the "decomposition" for these salts will normally be only an ionization. Ammonium carbonate is a preferred compound for use as the second component.

When compounds (such as carbonates and phosphates) are used which have a potential for forming precipitates with cations present in the steam generator feedwater, it is usually preferred to avoid mixing them into the feedwater, instead introducing the compounds directly into generated steam, such as by pumping a solution of the compounds into a steam conduit. This will assist in avoiding scale formation in the steam generator.

The two components are used together to produce a buffered and/or partially neutralized system which prevents acidic pH values in injected steam. Actual ratios of these components' concentrations in an inhibitor is dependent upon both the particular compounds which are chosen for the components and the limits of pH value changes which are acceptable during the steam treatment being conducted.

For a given chemical system, it is generally true that increasing the concentration of the first component, with respect to the concentration of the second component, will result in a lower steam pH value. A presently preferred inhibitor composition is an aqueous solution containing about 46 percent by weight ammonium nitrate and 34 percent by weight urea, which will prevent the pH of steam from decreasing below about 8.3, even with severe overtreatment. Buffering at lower pH values, such as values closer to 7, can be obtained by increasing the concentration ratio of ammonium nitrate to urea.

While the invention is not to be bound to a particular theory, it is believed that neutralization and buffering is established, for example, by the hydrolysis of urea to ammonium carbonate, which is a salt of a weak acid (carbonic acid). The weak acid is able to combine with some of the hydrogen ions produced by decomposition of the first component, thereby preventing excessive pH reduction.

The amounts of the components to be used for a particular treatment depends upon the amount of bicarbonate present in the feedwater for steam generation and the desired steam pH. For the components ammonium nitrate and urea, a presently preferred weight ratio of ammonium nitrate to urea is about 1.35. Where this ratio is employed, a treatment using about 0.25 grams to about 2.5 grams of the mixed components, per liter of steam generation feedwater, will be effective for normally encountered bicarbonate concentrations in the feedwater. More preferred for most feedwater is a treatment using about 0.35 to about 1.25 grams of the mixed components, per liter. If other compounds are used, or if different component ratios are used, it will be helpful to conduct a simple experiment (as in the following examples) to assist in choosing relative and absolute amounts of the two components, for treating a particular steam or feedwater.

The invention is further illustrated by the following examples which are illustrative of various aspects of the invention and are not intended as limiting the scope of the invention as defined by the appended claims.

EXAMPLE 1

The effect of various treatments for steam generation is studied, using a laboratory steam generator, designed and constructed to simulate the pressure temperatures, and steam qualities common for oilfield steam injection. Synthetic boiler feedwater, prepared by dissolving sodium sulfate, sodium chloride, sodium bicarbonate, and the desired treatment in deionized water, is pumped through tubing, a section of which is heated in an oil bath or by a heating tape to produce the desired quality of steam. Steam is passed through a sight glass vapor-liquid separator, which is heated by heating tapes to about 422° F., the temperature corresponding to saturated steam at 315.5 p.s.i.a. The vapor phase is passed through a condenser, then through a valve which maintains system pressure and into a collection vessel. The liquid phase passes through a cooler, through a metering valve and into a collection vessel.

Steam of about 80 percent quality, generated from a solution containing about 148 mg/l sodium sulfate, about 2,107 mg/l sodium chloride, about 1,276 mg/l sodium bicarbonate, and varying levels of ammonium chloride gives liquid-phase pH values as shown in Table 1. These data clearly show the acidic pH levels which are obtained by overtreating a boiler feedwater with only the first component of the invention.

It should be noted that the term "overtreatment" has a somewhat variable meaning, since it relates to the range of pH values which is desired after treatment of steam or boiler feedwater. In the present context, it is desired to avoid severe corrosion of metals which will be obtained with steam pH values which are significantly less than about 7. Therefore, "overtreating" is considered in this example to be shown by acidic steam.

TABLE 1

| mg/l NH$_4$Cl | Liquid pH |
|---|---|
| 0 | 12.4 |
| 183 | 11.9 |
| 333 | 10.3 |
| 505 | 9.5 |
| 687 | 8.0 |
| 1671 | 6.4 |
| 2667 | 2.3 |

EXAMPLE 2

A solution containing about 220 mg/l sodium bicarbonate and varying amounts of UAN 32 (a product of Union Chemicals Division, Union Oil Company of California), an aqueous solution which contains about 34 percent urea and about 46 percent ammonium nitrate, is used to generate steam of about 32.5 percent quality at 360° F. Samples of both the cooled liquid phase and condensed vapor phase are analyzed for pH, giving results summarized in Table 2. These data show the buffering effect obtained by use of the invention, for treating boiler feedwater with two components. A "correct" level of treatment, using this feedwater and inhibitor solution, will give a steam liquid phase pH of about 9.31. Even severe overtreatment does not cause acidic pH levels.

TABLE 2

| mg/l UAN 32 | Liquid pH | Vapor pH |
|---|---|---|
| 0 | 11.02 | 5.72 |
| 532 | 9.31 | 8.51 |
| 1,064 | 8.71 | 8.97 |
| 10,640 | 8.56 | 8.84 |

EXAMPLE 3

An experiment is conducted to determine the effect of varying boiler feedwater bicarbonate concentrations upon steam pH, using a constant level of an inhibitor of the invention.

Synthetic boiler feedwater, prepared by dissolving sodium bicarbonate in deionized water and adding a solution containing about 34 weight percent urea and about 46 weight percent ammonium nitrate (producing a urea concentration about 452 mg/l and an ammonium nitrate concentration about 612 mg/l), is pumped through metal tubing, a portion of which is heated to produce steam. This steam is passed through a sight glass vapor-liquid separator, which is heated by heating tapes to about 360° F. (corresponding to saturated steam at about 153 p.s.i.a.). The steam vapor phase is passed through a condenser, then through a valve which maintains system pressure and into a collection vessel for pH determination. The steam liquid phase passes through a cooler, a metering valve, and into a collection vessel for pH determination.

When steam having a quality about 39 percent to about 58 percent, at 360° F., is generated, results as summarized in Table 3 are obtained. These results show that widely varying bicarbonate concentrations can be tolerated at a given level of feedwater treatment with the inhibitor.

TABLE 3

| mg/l NaHCO$_3$ | Liquid pH | Vapor pH |
| --- | --- | --- |
| 220 | 8.71 | 8.97 |
| 400 | 8.90 | 8.83 |
| 548 | 9.10 | 8.70 |
| 700 | 9.54 | 8.76 |

EXAMPLE 4

The method of the invention is studied in an oilfield near Santa Maria, Calif., as part of a fieldwide thermal oil recovery project. Steam is generated using a once-through steam generator which converts fresh water from a well into about 60 to about 80 percent quality steam at temperatures about 480° F. to about 520° F. This steam, including both liquid and vapor phases, is injected through a wellbore into an oil-bearing formation, to heat the formation.

Before introduction into the steam generator, feedwater is filtered and softened, giving a water which contains about 280 mg/l bicarbonate and about 1,100 mg/l total dissolved solids. An aqueous inhibitor solution, containing about 34 weight percent urea and about 46 weight percent ammonium nitrate, is added in a desired amount to the water by a pump. The treated feedwater is then pumped into the steam generator at about 20 to about 30 gallons per minute.

A portion of the produced steam is passed through a vapor-liquid separator, to obtain a sample of the steam liquid phase. This liquid is cooled, passed through a metering valve, and collected for pH analysis.

Results are summarized in Table 4. These results indicate that the inhibitor solution effectively reduces steam liquid phase pH, to a range which will not cause silica dissolution in rock or gravel pack. Also, overtreatment by a large factor beyond that amount needed to achieve effective inhibition (pH 9.32 in Table 4) will not cause the liquid phase to become acidic.

TABLE 4

| [NH$_4$NO$_3$ + (NH$_2$)$_2$CO], mg/l | Liquid pH |
| --- | --- |
| 0 | 11.3 |
| 472 | 9.62 |
| 640 | 9.32 |
| 1,698 | 9.05 |

Various embodiments and modifications of this invention have been described in the foregoing description and examples, and further modifications will be apparent to those skilled in the art. Such modifications are included within the scope of the invention as defined by the following claims.

What is claimed is:

1. A method for injecting steam into a subterranean reservoir via a well penetrating the reservoir, comprising adding to steam generator feedwater used to generate the steam, or adding to the steam, or adding to both the feedwater and the steam, a mixture comprising:
   (a) a compound selected from the group consisting of ammonium salts of inorganic acids, ammonium salts of carboxylic acids, quaternary ammonium halides, amine or substituted amine hydrochlorides, and mixtures thereof; and
   (b) a compound selected from the group consisting of ammonia, salts which decompose to form acid neutralizers or buffers having alkaline pH values, amides of carbamic acid or thiocarbamic acid and derivatives of such amides, tertiary carboxylic acid amides and their substituted and alkylated derivatives, and mixtures thereof.

2. The method defined in claim 1, wherein the compound of subparagraph (a) is an ammonium salt of an inorganic acid, selected from the group consisting of ammonium nitrate, ammonium nitrite, ammonium sulfate, ammonium bisulfate, ammonium sulfite, ammonium bisulfite, ammonium sulfamate, ammonium borate, ammonium cyanate and derivatives thereof, ammonium thiocyanate, ammonium chromate, ammonium dichromate, and ammonium halides.

3. The method defined in claim 2, wherein the salt is ammonium nitrate.

4. The method defined in claim 2, wherein the salt is an ammonium halide.

5. The method defined in claim 4, wherein the salt is ammonium chloride.

6. The method defined in claim 1, wherein the compound of subparagraph (b) is urea.

7. The method defined in claim 1, wherein the steam is a wet steam, containing up to about 80 percent by weight liquid water.

8. The method defined in claim 7, wherein sufficient mixture is added to produce pH values in a liquid component of the steam about 7 to about 10.5.

9. The method defined in claim 1, wherein the compound of subparagraph (a) is ammonium nitrate, and the compound of subparagraph (b) is urea.

10. The method defined in claim 9, wherein a weight ratio of ammonium nitrate to urea is about 1.35.

11. The method defined in claim 10, wherein about 0.25 grams to about 2.5 grams of the mixture are added, per liter of steam generator feedwater.

12. The method defined in claim 11, wherein about 0.35 grams to about 1.25 grams of the mixture are added, per liter of feedwater.

13. A method for injecting steam into a subterranean reservoir via a well penetrating the reservoir, comprising adding to steam generator feedwater, or to the steam, a mixture comprising:
   (a) an ammonium salt of an inorganic acid;
   (b) a compound selected from the group consisting of ammonia, salts which decompose in steam to form acid neutralizers or buffers having alkaline pH values, amides of carbamic acid or thiocarbamic acid and derivatives of such amides, tertiary carboxylic and amides and their substituted and alkylated derivatives, and mixtures thereof.

14. The method defined in claim 13, wherein the compound of subparagraph (a) is ammonium nitrate.

15. The method defined in claim 13, wherein the compound of subparagraph (a) is an ammonium halide.

16. The method defined in claim 15, wherein the ammonium halide is ammonium chloride.

17. The method defined in claim 13, wherein the compound of subparagraph (b) is urea.

18. The method defined in claim 13, wherein the compound of subparagraph (b) is ammonia.

19. The method defined in claim 13, wherein the compound of subparagraph (b) is ammonium carbonate.

20. The method defined in claim 13, wherein sufficient mixture is added to produce pH values in a liquid component of the steam about 7 to about 10.5.

21. The method defined in claim 20, wherein the compound of subparagraph (a) is ammonium nitrate and the compound of subparagraph (b) is urea.

22. The method defined in claim 21, wherein a weight ratio of ammonium nitrate to urea is about 1.35.

23. The method defined in claim 22, wherein about 0.25 grams to about 2.5 grams of the mixture are added, per liter of steam generator feedwater.

24. The method defined in claim 23, wherein about 0.35 grams to about 1.25 grams of the mixture are added, per liter of feedwater.

25. A method for treating steam which is to be injected into a subterranean reservoir, comprising adding to steam generator feedwater, or to the steam, a mixture comprising an ammonium salt of an inorganic acid and urea, in sufficient amounts to produce pH values in a liquid component of the steam about 7 to about 10.5.

26. The method defined in claim 25, wherein the salt is ammonium chloride.

27. The method defined in claim 25, wherein the salt is ammonium nitrate.

28. The method defined in claim 27, wherein a weight ratio of ammonium nitrate to urea is about 1.35.

29. The method defined in claim 28, wherein about 0.25 grams to about 2.5 grams of the mixture are added, per liter of steam generation feedwater.

30. The method defined in claim 29, wherein about 0.35 grams to about 1.25 grams of the mixture are added, per liter of feedwater.

* * * * *